Oct. 19, 1965
H. E. PAARMA ETAL  
DEVICE FOR MEASURING DIFFERENCES  
IN HEIGHT OR ALTITUDE  
Filed April 1, 1963
3,212,195
FIG. 1
FIG. 2
FIG. 3
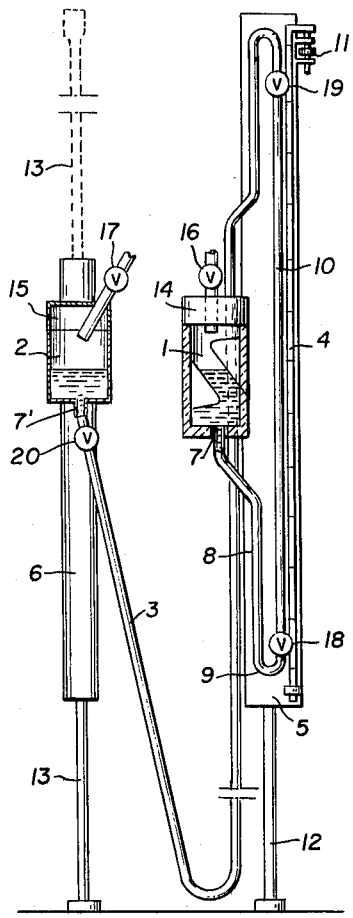
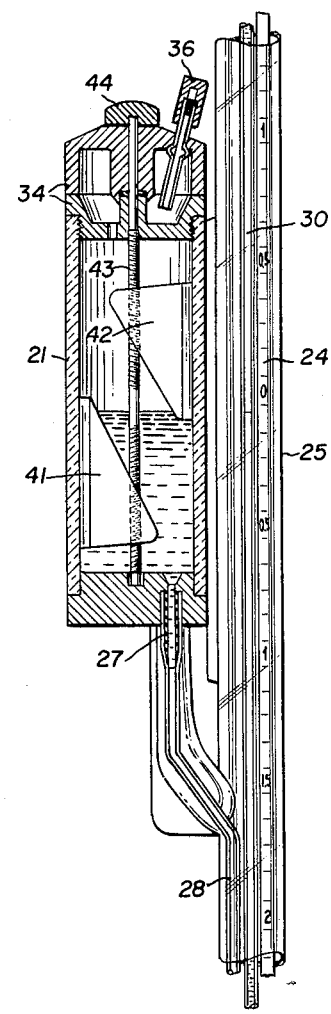
INVENTORS  
HEIKKI ELJAS PAARMA  
OIVA VILLE KANGASSALO
BY *Horace B. Van Valkenburgh*
ATTORNEY

United States Patent Office 3,212,195
Patented Oct. 19, 1965

3,212,195
DEVICE FOR MEASURING DIFFERENCES
IN HEIGHT OR ALTITUDE
Heikki Eljas Paarma and Oiva Ville Kangassalo,
Otanmaki, Finland
Filed Apr. 1, 1963, Ser. No. 269,658
7 Claims. (Cl. 33—209)

In many trades and professions, the ability to measure differences in height or altitude between two points is a necessity. The devices in use at present are very largely dependent on visual contact between the points measured, and thus on variations in weather and temperature, etc. Often, when measuring altitudes in the terrain with a levelling instrument, theodolyte, or the like, it is harder work to remove the visual obstacles than to perform the actual measurement. The operation calls for specially trained personnel and cannot be carried out in rainy weather.

The object of the present invention is to provide a device by which differences in height and altitude can be measured to a high degree of accuracy under all conditions, irrespective of visual contact.

Another object of the invention is to provide a device which includes means for compensation of errors in the measured heights or altitudes due to temperature fluctuations.

A still further object of the invention is to provide a device which includes automatical means for compensation of said errors.

The invention relates to a device of the kind which comprises a flexible hose extended between the two points to be measured, and filled with liquid, one end of the hose being under atmospheric pressure and the other end being connected to one branch of a U-tube filled with a heavier liquid, one branch of said U-tube being enlarged to form a container, having a cross-sectional area which is many times greater than the cross-sectional area of the other branch. The U-tube is also connected to a scale that indicates the difference in altitude or height.

In accordance with the invention, the surface area of the liquid in the said container is adjustable by altering the position relative to each other of solid bodies of inverse shape being movable in opposite directions to each other in the liquid.

Here follows a detailed description of the invention, with special reference to the embodiments illustrated in the accompanying drawing, in which:

FIG. 1 shows schematically a measuring device according to the invention, and

FIGS. 2 and 3, drawn to a larger scale, show details of two different embodiments of the invention.

The device shown in FIG. 1 consists of two containers 1 and 2, joined by a hose 3. The containers are filled with liquids of different specific gravities which do not mix with or dissolve into each other. Non-limiting examples of suitable pairs of liquids are water and oil, and mercury and water. Container 1 holds the heavier liquid, container 2 the lighter.

Container 1 is secured to a frame 5, and container 2 is secured to a frame 6. One end of hose 3 is connected to the bottom of container 1 at 7, then it is attached to frame 6 to extend downwards over a portion 8, to make a U-turn 9 and to extend vertically upwards over a substantial portion 10. The other end of hose 3 is connected to the bottom of container 2 at 7'.

When the surfaces of the liquids in the two containers 1 and 2 are at the same level, the boundary surface between the liquids is also at this level, and said surface will then be positioned approximately in the middle of the vertical portion 10 of hose 3. When container 2 is taken to a higher altitude, the lighter liquid in it tends to flow into the lower container 1 and, in doing so, displaces the heavier liquid at the boundary surface between the liquids downwards. If on the other hand container 2 is at a lower level than container 1, the lighter liquid flows into its own container, and thus sucks the heavier liquid at the boundary surface between the liquids upwards. The distance of movement of said boundary surface is a measure of the difference in height between the liquid surfaces in the containers. To indicate this difference in height there is provided a scale 4 adjacent portion 10 of hose 3, said scale having its zero-point level with the boundary surface between the two liquids when their surfaces in containers 1 and 2 are at the same level. Scale 4 is graduated upwards and downwards from the zero-point in the required unit of measurement, such as is more clearly shown in FIG. 2. Preferably scale 4 is adjustable in the vertical direction, e.g. by means of an adjusting screw, such as indicated at 11.

To facilitate operation, the frames 5 and 6 can be provided with extension rods 12 and 13 which are removably connected to the lower ends of the frames, the lengths of the rods 12 and 13 being such that the reading on the scale 4 is 0 when the lower ends of said rods are level with each other, and that the zero-point of the scale is at a suitable height over the ground for convenient reading off the scale. Extension rod 13 may also be connected to the upper end of the frame 6, as indicated in dotted lines in FIG. 1, in case the height to a surface overhead, e.g. to a ceiling in a building, is to be measured. To measure distances longitudinally, the hose 3 can be furnished with either a linear measurement scale, marked direct on the material of the hose itself, or a measuring wire.

In practice the frame 5 can be made of a tube of a rigid transparent plastic, so that the U-portions 8, 9, 10 of hose 3 and the scale 4 can be placed inside it. (FIG. 2.)

The liquid surfaces in the containers must be under atmospheric pressure. On the other hand, the liquid must remain in the containers and not spill, even if the latter are accidentally turned upside down or during conveyance. The containers 1 and 2 are therefore furnished with lids 14 and 15 fitted with valves 16 and 17, which are opened during measurement and shut tight during conveyance. In addition, the hose 3 is furnished with valves 18, 19 and 20 to prevent the liquids flowing from one container to the other during conveyance.

To enable the device to be used regardless of variations in the environment, it is furnished with a device by which errors due to temperature fluctuations and the like can be compensated. When the temperature changes, the specific gravities of different liquids vary in different ways. This causes the boundary surface between the two liquids to give inaccurate readings on the scale. Furthermore, the scale itself expands and contracts as the temperature varies.

All these errors can be counteracted by means of an adjustment device that regulates the area of the surface of the heavier liquid. Such a device enables the movement of the liquid upwards and downwards, and thus also the movement of the boundary surface between the two liquids to be accelerated or retarded, as required, to conform to the prevailing conditions.

In FIG. 2 an embodiment is shown including such an adjustment device. In FIG. 2 all parts corresponding to the embodiment of FIG. 1 are designated by the same reference numerals added by 20, and such parts are not described in detail.

In the embodiment shown in FIG. 2, two wedge bodies 41 and 42 are used to make the adjustment. The wedge bodies 41 and 42 are of the same shape, are positioned diametrically opposite each other, and move simultaneously, being actuated by a worm rod 43. Said rod 43 is furnished with threads, one for each wedge body, running in opposite directions, so that when the rod is turned by means of a knob 44 outside the lid 24 the wedge bodies move equal distances in opposite directions. The wedge bodies 41 and 42 may be e.g. rectangular in cross-section, except that the outer edge thereof corresponds to the inner periphery of container 21, which may be e.g. circular in cross-section. The advantage of this adjustment device is that the volume in the container remains unchanged when the wedge bodies are moved, so that the surface of the liquid remains constantly at the same level, even though its area is altered. This eliminates the need to re-zero the scale 24. When this method is used, the device can be furnished with a thermometer in the liquid and an adjustment scale on the knob 44 or the transparent material of the container 21 that corresponds to the temperature.

If the same pair of liquids always is used in the device so that temperature is the only variable factor, the adjustment process can be made automatic by means of a thermo-relay. An example of such an embodiment is shown in FIG. 3. In a container 51 provided with a lid 64 having a valve 66 there are provided two wedge bodies 71 and 72, all said parts corresponding to the embodiment of FIG. 2. Wedge 71 is supported by means of a plurality of strips 74 of equal length having a selected thermal expansion coefficient, the upper ends of said strips being fastened to a support 75 and the lower ends being fastened to wedge 71. Wedge 72 is also supported by means of a plurality of strips 76 of equal length and the same material as strips 74, but in this case the lower ends of the strips are fastened to a yoke 77 and the upper ends are fastened to wedge 72. Support 75 and yoke 77 are fastened to a plate 78 which is vertically adjustable by means of a screw 79.

When in this embodiment the strips 74 and 76 expand or contract due to temperature variations, the wedges 71 and 72 will automatically move equal distances in opposite directions.

By modifying the liquid surface area, it is also possible to counteract other variable factors, such as changes in the concentration of the liquids when solutions are used. It is particularly useful in the latter case, for such adjustment eliminates the need constantly to maintain one particular concentration; minor variations in the concentration can be allowed for by adjusting the measuring device.

If mercury and water are used as the pair of liquids, and if the containers and the hose are made of a suitable plastic, temperature compensation becomes practically automatic since the thermal expansion coefficients of said materials correspond almost exactly to each other.

What we claim is:

1. A device for measuring differences in height or altitude between two points, comprising a flexible tube being extendable between said points and having a first container connected to one end thereof and a second container connected to the opposite end thereof, said tube forming a U-portion adjacent said second container, the leg of said U-portion remote from said container extending vertically over a substantial length in the operative position of said device, a liquid in said first container having a selected specific gravity, another liquid in said second container having a specific gravity greater than that of said first mentioned liquid, said liquids being immiscible with each other and filling together said tube to have a boundary surface in said vertically extending portion in said tube, a height scale adjacent said vertically extending portion of said tube, and means for adjusting the surface area of the liquid in said second container.

2. A device as in claim 1, said means for adjusting the surface area of the liquid in said second container comprising a pair of inversely positioned bodies of identical wedge shape being partly immersed in said liquid and adjustable to an equal degree in opposite directions.

3. A device as in claim 1, said height scale being adjustable in its longitudinal direction.

4. A device as in claim 1, each of said containers having a cross-sectional area being a multiple of times larger than that of said tube.

5. A device as in claim 1, each of said containers having a passage above the surface of the liquid therein being open to the atmosphere and provided with shut-off means.

6. A device as in claim 1, said tube being provided with shut-off means on both sides of said boundary surface between said liquids.

7. A device as in claim 1, said liquids being water and mercury.

References Cited by the Examiner
FOREIGN PATENTS
6,742  1834  Great Britain.

RICHARD C. QUEISSER, *Primary Examiner.*